US012600576B2

(12) United States Patent
Tachibana et al.

(10) Patent No.: US 12,600,576 B2
(45) Date of Patent: Apr. 14, 2026

(54) APPARATUS FOR CHECKING OPERATION OF CARRIER DEVICE AND COMPUTER PROGRAM

(71) Applicant: ITOH DENKI CO., LTD., Kasai (JP)

(72) Inventors: Toshiyuki Tachibana, Kasai (JP); Shin Asada, Kasai (JP)

(73) Assignee: Itoh Denki Co., Ltd., Kasai (JP)

( * ) Notice: Subject to any disclaimer, the term of this patent is extended or adjusted under 35 U.S.C. 154(b) by 702 days.

(21) Appl. No.: 18/010,310

(22) PCT Filed: Jun. 16, 2021

(86) PCT No.: PCT/JP2021/022854
§ 371 (c)(1),
(2) Date: Dec. 14, 2022

(87) PCT Pub. No.: WO2021/256505
PCT Pub. Date: Dec. 23, 2021

(65) Prior Publication Data
US 2023/0227268 A1 Jul. 20, 2023

(30) Foreign Application Priority Data
Jun. 19, 2020 (JP) ................................. 2020-106183

(51) Int. Cl.
*B65G 43/10* (2006.01)

(52) U.S. Cl.
CPC ...... *B65G 43/10* (2013.01); *B65G 2203/0266* (2013.01); *B65G 2203/042* (2013.01)

(58) Field of Classification Search
CPC ............ B65G 43/10; B65G 2203/0266; B65G 2203/042; B65G 47/54; G05B 19/4189
See application file for complete search history.

(56) References Cited

U.S. PATENT DOCUMENTS

2003/0163217 A1 * 8/2003 Nakamoto ......... G05B 23/0272
700/121

FOREIGN PATENT DOCUMENTS

EP 3064285 A1 * 9/2016 ............. G01G 11/04
JP 2005231745 A * 9/2005 ............. B65G 43/10
(Continued)

OTHER PUBLICATIONS

International Preliminary Report on Patentability and Written Opinion of the International Searching Authority, issued Dec. 13, 2022, in International Application No. PCT/JP2021/022854.

*Primary Examiner* — Jacob S. Scott
*Assistant Examiner* — Erin Morris
(74) *Attorney, Agent, or Firm* — Wood, Phillips, Katz, Clark & Mortimer

(57) ABSTRACT

Provided is an operation check device for a conveyer device, the operation check device being capable of reproducing and checking operation of the conveyer device. The operation check device includes: a log data creation unit that creates log data in which operation states of a drive motor and a load presence sensor of each of the conveyer units of a conveyer device are individually recorded; an operation reproduction unit that creates video data that schematically reproduces operation of the conveyer device and operation state data on the drive motor as well as the load presence sensor from moment to moment, based on the log data; and a display device that displays a video based on the video data created by the operation reproduction unit and an image based on the operation state data.

20 Claims, 7 Drawing Sheets

(56) References Cited

FOREIGN PATENT DOCUMENTS

| | | | | |
|----|------------------|---|----------|-------------|
| JP | 2011088219 A | * | 5/2011 | |
| JP | 2013051282 A | * | 3/2013 | |
| JP | 2013-2301914 A | | 11/2013 | |
| JP | 2015040122 A | * | 3/2015 | |
| WO | WO-2013147011 A1 | * | 10/2013 | ............ B65G 43/10 |

* cited by examiner

FIG. 5

LOAD PRESENCE SENSOR ON

LOAD PRESENCE SENSOR OFF

——— ENERGIZATION

——— ENERGIZATION STOP

APPARATUS FOR CHECKING OPERATION OF CARRIER DEVICE AND COMPUTER PROGRAM

BACKGROUND OF THE INVENTION

Field of the Invention

The present invention relates to an operation check device for a conveyance device, the operation check device reproducing and checking operation of the conveyance device.

The present invention also relates to a computer program for controlling the operation check device for the conveyance device.

Background Art

Conveyance devices are often installed at a delivery place, a pickup place, a warehouse, or the like.

Known forms of the conveyance devices include a conveyance device with distributed control (Patent Document 1). The distributed control forms a series of conveying passages with multiple conveyer units, called zone conveyers, aligned in series or in a branched manner. Each of the conveyer units has an independent drive motor (drive device). Further, each of the conveyer units has a load presence sensor. The load presence sensor detects whether or not there is an article on the conveyer unit.

The conveyance device with the distributed control includes the conveyer units each constituting respective zones that are connected to each other.

Then, each of the conveyer units activates the drive motor of its own zone (conveyance unit) under predetermined condition, such as an article exists in the own zone (conveyance unit) and no article (conveyance object) exists in a downstream zone, thereby feeding the article to the downstream zone.

Additionally, a conveyance device including a zone having a branching function is also known (Patent Document 2).

The zone having a branching function includes a conveyer unit having a function of moving an article straight or discharging an article in a lateral direction, for example.

Patent Document 1: JP 2005-231745 A
Patent Document 2: JP 2013-230914 A

The conveyance device in operation may cause a defect. For example, an article being conveyed may cause a jam. The article also may overrun a position to be stopped.

When a defect occurs, the cause should be immediately investigated to correct the defect. However, the defect may occur at a low frequency. That is, when an article reaches the zone, the defect does not always occur, and may occur due to combination of some factors.

Such a case causes a maintenance engineer to be less likely to find a cause, so that the maintenance engineer needs to be near the conveyance device to wait for recurrence of the defect, thus wasting time.

It is an object of the present invention to provide an operation check device for a conveyance device, the operation check device being capable of reproducing and checking operation of the conveyance device, with the attention focusing on the problems of the prior art described above.

SUMMARY OF THE INVENTION

An aspect for solving the above problem is an operation check device for checking operation of a conveyance device, the conveyance device including: a part constituted by connecting multiple conveyance units; and an individual controller having a control circuit with a sequence circuit, the control circuit individually controlling one of the multiple conveyance units, the operation check device including: a log data creation unit; and an operation reproduction unit, wherein the log data creation unit acquires information about on-off states of switches at a same time to create log data on each individual controller, the switches constituting the sequence circuit of each individual controller, and wherein the operation reproduction unit reproduces operation of the sequence circuit of each individual controller based on the log data.

The conveyance device targeted by the operation check device of the present aspect includes the individual controllers each having the control circuit that individually controls the corresponding one of the conveyance units, and the individual controllers each include the sequence circuit.

The log data creation unit used in the operation check device of the present aspect acquires the information on the contemporaneous on-off states of the switches constituting the sequence circuit of each of the individual controllers to create the log data on the corresponding one of the individual controllers.

This makes it possible to reproduce an energized state of the sequence circuit, thus facilitating finding a cause of a defect.

The aspect described above is preferably configured such that the operation check device includes: individual reproducibility of designating one of the conveyance units to reproduce operation of the sequence circuit of the control circuit that controls the one of the conveyance units; and multi-reproducibility of designating two or more of the conveyance units to simultaneously reproduce operation of the sequence circuits of the control circuits that control the two or more of the conveyance units.

Each of the aspects described above is preferably configured such that at least one of the multiple conveyance units includes: a drive device that drives the conveyance unit; and a load presence sensor that detects whether or not an article is present on the conveyance unit, the log data created by the log data creation unit includes data on operation states of the drive motor and the load presence sensor each individually recorded, and the operation reproduction unit is capable of creating video data that schematically reproduces the operation of the conveyance device based on the log data.

Each of the aspects described above is preferably configured to further include a display device that displays a video based on the log data, the display device being capable of pausing, step forwarding, and fast forwarding the video.

Another aspect for solving a similar problem is an operation check device for checking operation of a conveyance device, the conveyance device including multiple conveyance units, at least one of the multiple conveyance units including: a drive device that drives the conveyance unit; and a load presence sensor that detects whether or not an article is present on the conveyance unit, the operation check device including: a display device; a log data creation unit; and an operation reproduction unit, wherein the log data creation unit creates log data on operation states of the drive device and the load presence sensor, each of the operation states being individually recorded, wherein based on the log data, the operation reproduction unit creates video data that schematically reproduces the operation of the conveyance device as well as operation state data on the drive device and on the load presence sensor from moment to moment, and wherein the display device displays a video based on the video data created by the operation reproduction unit and an image based on the operation state data.

The conveyance device is a conveyer device, for example. The conveyance device may include conveyers having upper and lower stages and a lifting and lowering device that transfers an article between the conveyers, for example.

The conveyance device also includes a device that conveys an article in an up and down direction, such as an elevator.

Yet another aspect for solving the problem described above is an operation check device for checking operation of a conveyance device, the conveyance device including: a part constituted by connecting multiple conveyance units, at least one of the multiple conveyance units including: a drive device that drives the conveyance unit; and a load presence sensor that detects whether or not an article is present on the conveyance unit, the operation check device including: a display device; a log data creation unit; and an operation reproduction unit, wherein the log data creation unit creates log data on operation states of the drive device and the load presence sensor, each of the operation states being individually recorded, wherein based on the log data, the operation reproduction unit creates video data that schematically reproduces the operation of the conveyance device as well as operation state data on the drive device and on the load presence sensor from moment to moment, and wherein the display device displays a video based on the video data created by the operation reproduction unit and an image based on the operation state data.

The operation check device for the conveyance device of the present aspect (hereinafter, may be simply referred to as the operation check device) includes the log data creation unit, and the operation states of the drive device of each of the conveyance units of the target conveyance device and the load presence sensor are individually recorded to create the log data.

For example, when some kind of defect occurs in operation of the conveyance device, the operation states of the drive device and the load presence sensor of each of the conveyance units at the time of the occurrence of the defect are also recorded.

The operation check device for the conveyance device of the present aspect also includes the operation reproduction unit that creates video data that schematically reproduces the operation of the conveyance device based on the log data, and the display device that displays the video. Thus, the display device reproduces a state of the occurrence of the defect.

The display device displays the image based on the operation state data, so that a document for investigating the cause of the defect is provided to help investigate the cause.

The aspect described above is preferably configured such that the drive device is a motor, and the log data creation unit is configured to acquire an on-off state of the load presence sensor, an on-off status of the drive device, and information about rotation during driving of the drive device to creates the log data.

The information on the rotation is the number of revolutions at one time or a rotation speed, for example.

The operation check device of the present aspect has an excellent reproducibility in operation.

Each of the aspects described above is preferably configured such that the conveyance unit includes a control circuit controlling the conveyance unit, the control circuit including a sequence circuit, and wherein the log data creation unit acquires information about on-off states of switches constituting the sequence circuit to create the log data.

The operation check device of the present aspect facilitates investigating the cause of the defect.

Each of the aspects described above is preferably configured such that the display device is configured to display an outline figure imitating the conveyance device based on the video data, the outline figure being constituted by connecting figures imitating the conveyance units; and when the load presence sensor detects the article, the figure imitating the conveyance unit is displayed such that it includes a figure imitating an article.

The operation check device of the present aspect has an excellent reproducibility in operation.

The aspect described above is preferably configured such that when the load presence sensor detects an article and the drive device is energized, the figure imitating the article moves toward an adjacent conveyance unit.

The operation check device of the present aspect has an excellent reproducibility in operation.

The aspect described above is preferably configured such that the conveyance unit includes a control circuit that controls the conveyance unit, and the operation check device is capable of displaying operation state of the control circuit of specific one of the conveyance units from moment to moment.

The operation check device of the present aspect facilitates investigating the cause of the defect.

Each of the aspects described above is preferably configured such that the operation reproduction unit includes a configuration storage unit and a circuit storage unit, the configuration storage unit stores a constitution of the conveyance units constituting the conveyance device and a connection between the conveyance units, and the circuit storage unit stores the control circuit of each of the conveyance units.

The operation check device of the present aspect has an excellent reproducibility in operation. The operation check device of the present aspect also facilitates investigating the cause of the defect.

Yet another aspect for solving a similar problem is a computer program for operating an operation check device that checks operation of a conveyance device, wherein the operation check device is constituted by connecting multiple conveyance units, at least one of the conveyance units including: a drive device that drives the at least one of the conveyance units; and a load presence sensor that detects whether or not an article is present on the conveyance unit, the computer program causing the operation check device to execute a process including: inputting log data recording operation states of the drive device and the load presence sensor, both being recorded individually; and creating: video data schematically reproducing operation of the conveyance device; data on operation state of the drive device from moment to moment; and data on operation state of the load presence sensor from moment to moment.

The computer program of the present aspect makes it possible to reproduce a state when the defect occurs because the video data that schematically reproduces the operation of the conveyance device and the data on the operation state are created based on the log data.

The operation check device and the computer program for the conveyance device of the present invention enables reproducing and checking operation of the conveyance device.

BRIEF DESCRIPTION OF THE DRAWINGS

FIG. 5 is a block diagram of a zone controller and a circuit diagram illustrating a relationship between each zone controller and a log data creation unit.

DETAILED DESCRIPTION OF THE PREFERRED EMBODIMENTS

Hereinafter, an embodiment of the present invention will be further described.

Figure 1:
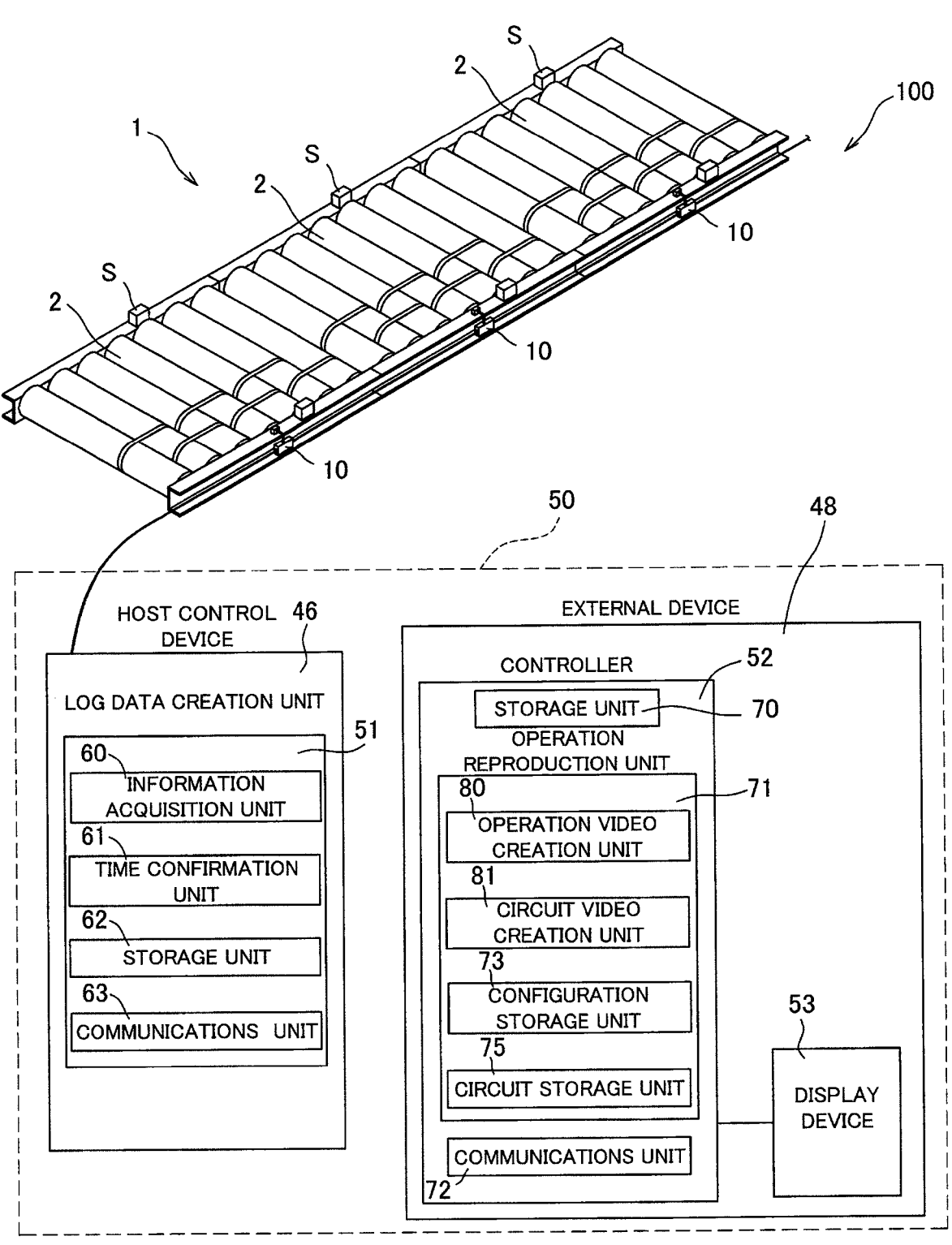
FIG. 1 is a conceptual diagram of a conveyer system including an operation check device for a conveyance device according to an embodiment of the present invention.

FIG. 1 conceptually illustrates a conveyer system 100 including an operation check device 50 for a conveyance device and a conveyer device 1 to be checked.

As illustrated in FIG. 1, the operation check device 50 of the present embodiment includes a log data creation unit 51 and an external device 48. The log data creation unit 51 in the present embodiment is incorporated in a host control device 46 of the conveyer device 1.

The external device 48 is a known personal computer, a mobile terminal, or the like, and includes a controller 52 and a display device 53.

The controller 52 incorporates a storage unit 70, a communications unit 72, and an operation reproduction unit 71.

The operation check device 50 of the present embodiment is capable of: creating log data in which an actual operation state of each of conveyer units 2 and 20 in the conveyer device 1 is individually recorded; allowing the display device 53 to display operation of an article when each conveyer unit is operated according to the log data and a state of an electric circuit at the movement to check the operation and the state.

Figure 2:
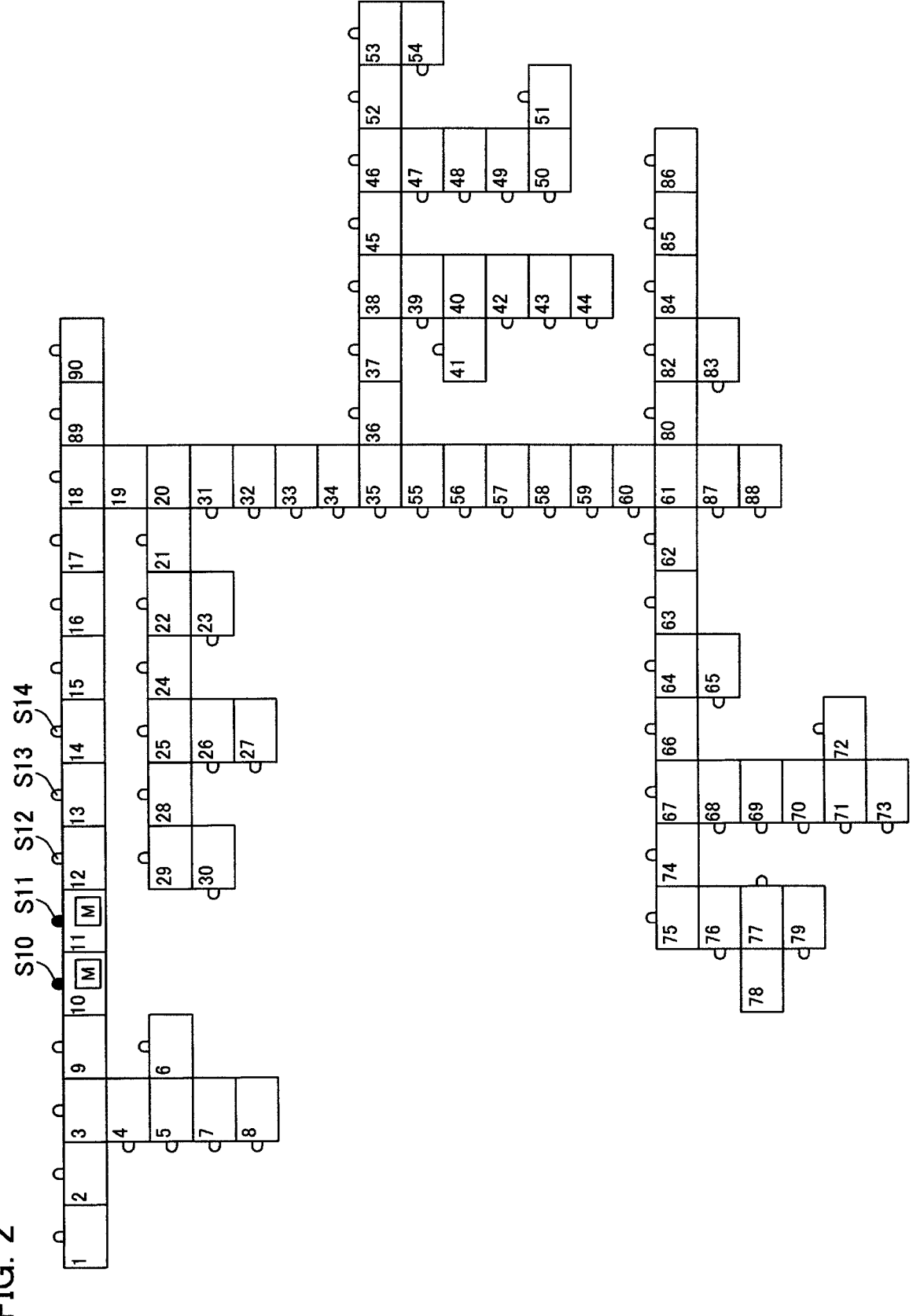
FIG. 2 is a layout of a conveyance device to be checked for operation and a display image of a display device.

Any conveyer device 1 is to be checked, and FIG. 2 illustrates an example of the conveyer device 1.

The conveyer device 1 is a conveyer having a layout as illustrated in FIG. 2, for example, in which a conveying passage is branched into multiple paths, and multiple destinations for conveying articles exist.

The conveyer device 1 is a distributed control type device, and includes the conveying passage with a linear part divided into multiple short zones. That is, the conveyer device 1 includes multiple linear conveying zones that are connected in series to constitute the linear part of the conveying passage. The conveyer device 1 also includes multiple conveying direction changing zones that constitute branched conveying passages.

Each is provided with the conveyer unit (conveyance unit) 2 and the conveyer unit 20 one by one. The conveyer units 2 and 20 are each formed by integrating a mechanical structure part and a zone controller 10. The zone controller 10 is an individual controller having a control circuit that individually controls the conveyance unit.

Figure 3:
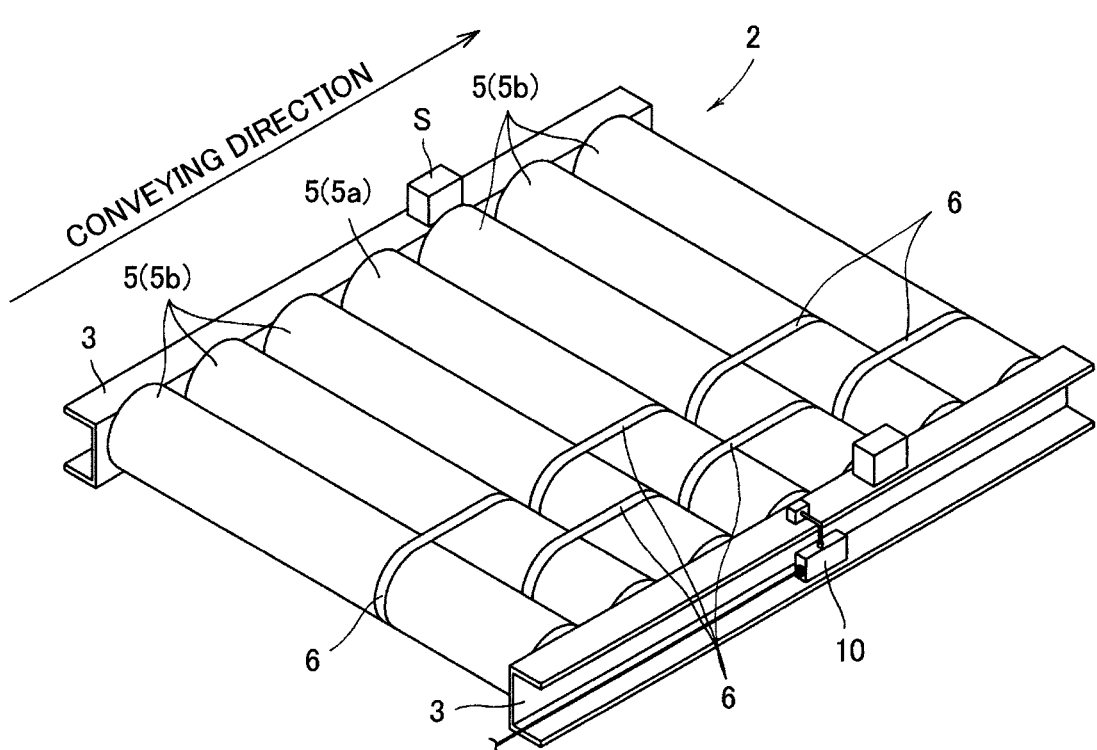
FIG. 3 is a perspective view of a conveyer unit constituting a linear conveying zone.
Figure 4:
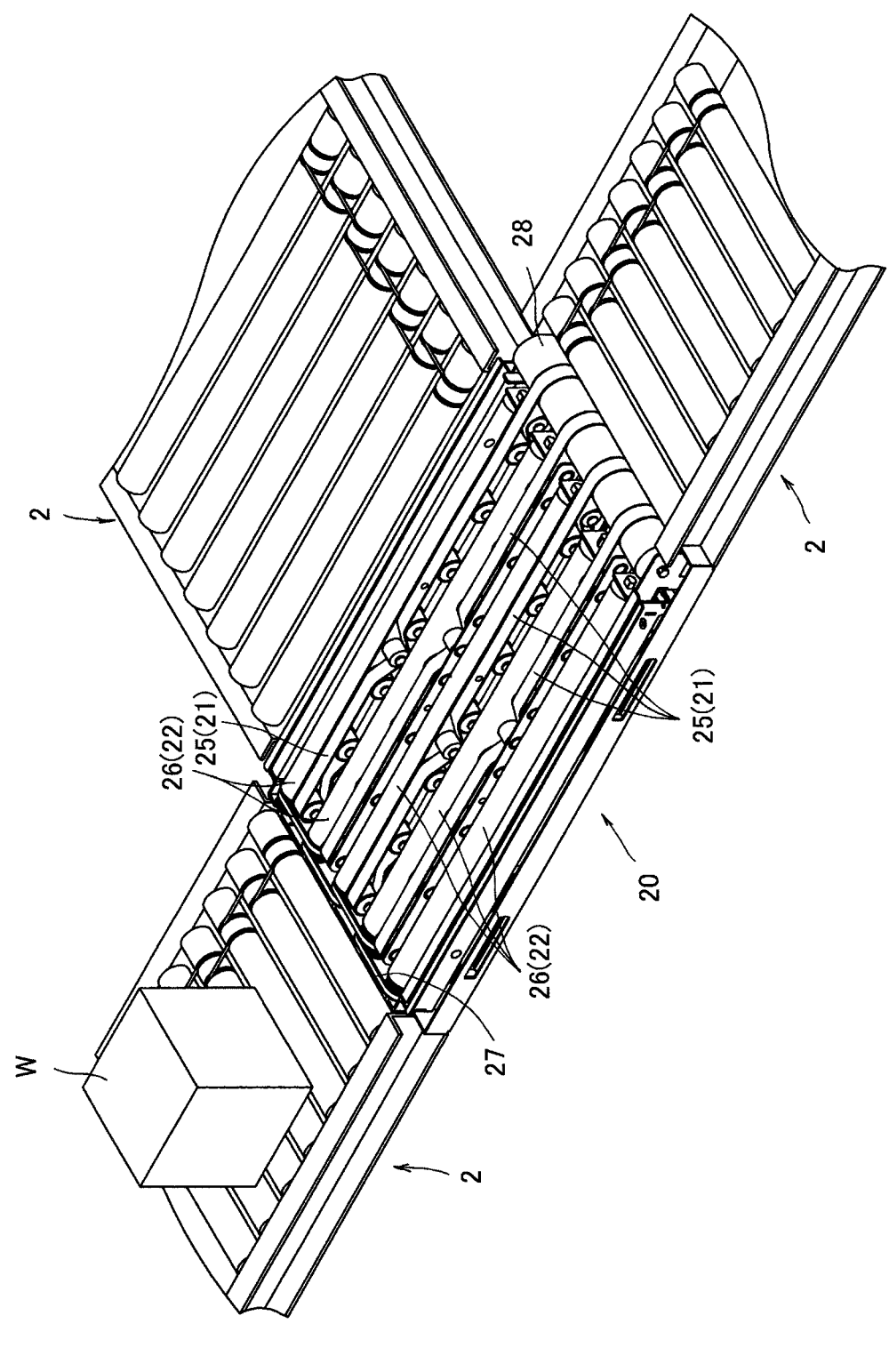
FIG. 4 is a perspective view of the vicinity of a conveying direction changing zone formed by a conveying direction changing device.

The conveyer unit 2 installed in the linear conveying zone is a representative conveyance unit, and is a zone conveyer as illustrated in FIG. 3. The conveyer unit 20 installed in the conveying direction changing zone is a transfer device as illustrated in FIG. 4. The conveyer unit 20 is also one of the conveyance units.

The conveyer unit 2 is a short roller conveyer in which multiple conveying rollers 5 are rotatably supported at predetermined intervals between a pair of left and right side frames 3 and 3 disposed parallel to each other. The conveying rollers 5 include a follower roller 5b that freely rotates and a motor-incorporating roller 5a. The present embodiment provides only one motor-incorporating roller 5a, and thus the others are all the follower rollers 5b. The motor-incorporating roller 5a incorporates a drive motor (not illustrated) as a drive device. The incorporated drive motor has a function of outputting a pulse signal to correspond to rotation. The same applies to a drive motor of another motor-incorporating roller. The pulse signal is an example of "information on rotation when a drive motor is driven".

The conveying rollers 5 adjacent to each other in the conveyer unit 2 are wound by a transmission belt 6. Thus, a rotational driving force of the motor-incorporating roller 5a can be transmitted to all the follower rollers 5b.

As illustrated in FIG. 3, the conveyer unit 2 is provided with a load presence sensor S. The load presence sensor S is provided on the side frame 3. The load presence sensor S is located near a downstream end.

The load presence sensor S detects whether or not an article exists on the conveyer unit 2.

Next, the conveying direction changing zone will be described. The conveyer unit (conveyance unit) 20 installed in the conveying direction changing zone is a transfer device as illustrated in FIG. 4. The conveyer unit 20 includes a direction changing mechanism that changes a conveying direction or a carry-in direction.

As illustrated in FIG. 4, the conveyer unit 20 includes a main conveying conveyer 21, a sub conveying conveyer 22, and a lifting and lowering device (not illustrated).

The main conveying conveyer 21 of the conveyer unit 20 is a belt conveyer including multiple thin belts 25 disposed at predetermined intervals. The main conveying conveyer 21 is driven by a motor-incorporating roller 28 provided at an end of the conveyer unit 20.

The sub conveying conveyer 22 of the conveyer unit 20 is a roller conveyer. The sub conveying conveyer 22 includes multiple rollers 26 that are disposed parallel to each other, and that work together with a belt 27. One of the multiple rollers 26 constituting the sub conveying conveyer 22 is a motor-incorporating roller, and all the rollers 26 rotate by driving the motor-incorporating roller.

As illustrated in FIG. 4, the sub conveying conveyer 22 is disposed with the rollers 26 existing between the corresponding belts 25 of the main conveying conveyer 21.

When an article W placed on the conveyer unit 20 is caused to travel straight, the main conveying conveyer 21 is caused to protrude upward from the sub conveying conveyer 22 by the lifting and lowering device (not illustrated), and the motor-incorporating roller 28 of the main conveying conveyer 21 is driven to cause the belts 25 to travel.

When the article W placed on the conveyer unit 20 is discharged in the lateral direction, the sub conveying conveyer 22 is raised and the main conveying conveyer 21 is lowered by the lifting and lowering device (not illustrated) to protrude the sub conveying conveyer 22 upward from the main conveying conveyer 21 after the article is drawn into the main conveying conveyer 21, and then the motor-incorporating roller of the sub conveying conveyer 22 is driven to rotate each of the rollers 26.

The conveyer unit 20 is also provided with a load presence sensor (not illustrated). The conveyer unit 20 is also provided with a zone controller (not illustrated) attached.

Each zone has an address that is uniquely set. For convenience, it is assumed that addresses 1 to 88 are assigned as illustrated in FIG. 2. The present embodiment allows the first zone to have the address 1, and the second zone to have the address 2. Hereinafter, addresses are sequentially assigned.

Each zone has the address that is stored in the zone controller (individual controller) 10 of the corresponding zone.

Figure 5:
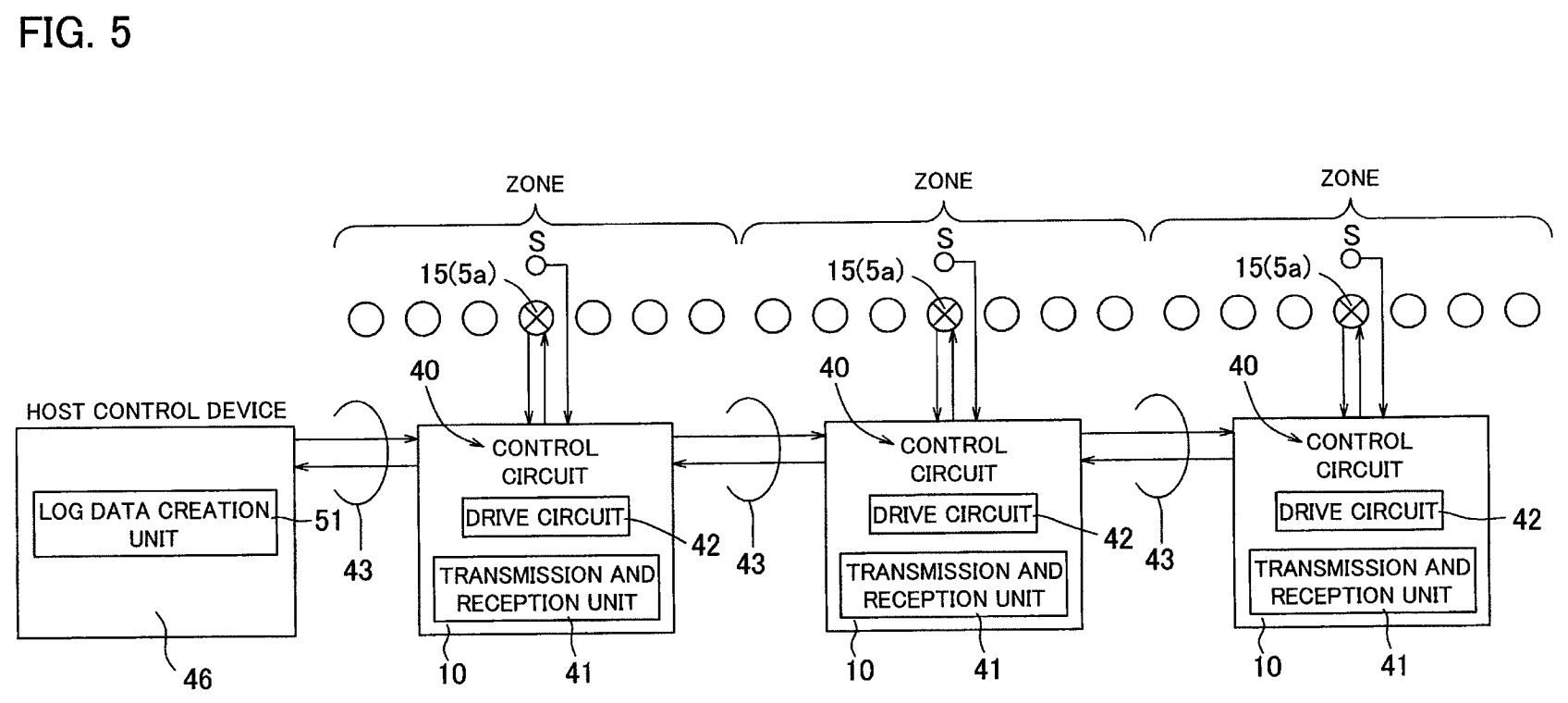

As described above, each zone includes the zone controller 10 and the load presence sensor S. The zone controller 10 is configured to supply power to the drive motor of each of the conveyer units 2 and 20 in each zone to drive and stop the drive motor of each of the conveyer units in the corresponding zone. That is, the zone controller 10 includes a control circuit 40 that controls a drive motor 15 as illustrated in FIG. 5, and the control circuit 40 includes a drive circuit 42. A part or all of the control circuit 40 is a sequence circuit.

The zone controller 10 incorporates a transmission and reception unit 41.

The zone controller 10 is an individual controller that individually controls each conveyance unit.

Zone controllers 10 are provided in all the zones, and the adjacent zone controllers 10 are connected to each other by a signal line 43. Each of the zone controllers 10 receives a signal of the load presence sensor S of the corresponding zone.

The conveyer device 1 includes the host control device 46 that is also connected to each of the zone controllers 10 by a signal line.

The host control device 46 in the present embodiment communicates with each of the zone controllers 10 via a communications unit. The communications unit allows each of the zone controllers 10 to input information of the load presence sensor S and the information on a driving state of the zone into the host control device 46.

Specifically, the host control device 46 receives an on-off state of the drive motor of each of the conveyer units 2 and 20, the number of rotation of each drive motor, an energized state of each control circuit 40, and the like. The zone controllers 10 each include a sequence circuit in the present embodiment, so that the host control device 46 receives on-off states and energized states of a switch, a timer, and other components in the circuit, one by one. The host control device 46 also receives a pulse signal generated in accordance with rotation of each drive motor one by one.

A host control device 40 receives information on on-off states of the drive motors of the conveyer units 2 and 20, the number of rotations of each of the drive motors, an energized state of each control circuit 40, and on-off states of switches constituting each sequence circuit at the same time, which are input to the host control device 46.

That is, the host control device 46 receives every information on each zone at the same time.

Next, the operation check device 50 of the conveyer device will be described.

The operation check device 50 of the present embodiment includes the log data creation unit 51 incorporated in the host control device 46 and the external device 48 installed at another position.

The log data creation unit 51 includes an information acquisition unit 60, a time confirmation unit 61, a storage unit 62, and a communications unit 63.

The time confirmation unit 61 is a clock.

The information acquisition unit 60 is implemented by a computer program, and acquires every information of the load presence sensor S and every driving state of each zone both transmitted from the zone controller 10 of each of the conveyer units 2 and 20 to the host control device 46.

The information acquisition unit 60 acquires information on on-off states of the drive motors of the conveyer units 2 and 20, the number of rotations of each of the drive motors, an energized state of each control circuit 40, and on-off states of switches constituting each sequence circuit at the same time.

Then, the information acquired by the information acquisition unit 60 is stored in the storage unit 62 as log data together with an acquisition time of the information.

The information in the storage unit 62 is continuously accumulated. The information is stored while being organized according to each operation period of the conveyer device 1. The information is stored while being distinguished into individual files such as "information on the conveyer device 1 on May 20, 2020" and "information on the conveyer device 1 on May 21, 2020".

When the memory capacity becomes insufficient, previous information is automatically erased.

The information accumulated in the storage unit 62 is transmitted to the external device 48 via the communications unit 63. The communications unit 63 may use an Internet line, for example.

Next, the external device 48 will be described. The external device 48 incorporates the controller 52 and the display device 53.

The controller 52 includes the storage unit 70, the operation reproduction unit 71, and the communications unit 72.

The communications unit 72 communicates with the communications unit 63 of the log data creation unit 51 to acquire the log data stored in the storage unit 62 of the log data creation unit 51 using the external device 48 The log data acquired by the communications unit 72 is stored in the storage unit 70.

The operation reproduction unit 71 is implemented by a computer program, and creates operation reproduction video data that schematically reproduces operation of the conveyer device 1 and energized state reproduction video data that expresses an operation state of each drive motor and an operation state of each load presence sensor S from moment to moment in a video, based on the log data.

That is, the operation reproduction unit 71 includes a computer program serving as an operation video creation unit 80 that creates the operation reproduction video data and a computer program serving as a circuit video creation unit 81 that creates the energized state reproduction video data.

Additionally, the operation reproduction unit 71 includes a configuration storage unit 73 and a circuit storage unit 75.

The configuration storage unit 73 stores a constitution of the conveyer units constituting the conveyer device 1 and a connection between the corresponding conveyer units.

The configuration storage unit 73 is a memory that stores the layout of the conveyer device 1 as illustrated in FIG. 2 and information on each zone where what is provided as the conveyer unit 2 or 20.

The circuit storage unit 75 also stores the control circuit 40 incorporated in each of the conveyer units 2 and 20. At least a part or all of the sequence circuit included in the control circuit 40 of each of the conveyer units 2 and 20 is stored.

Next, functions of the operation check device 50 of the present embodiment will be described.

For convenience of description, the actual conveyer device 1 is referred to as a "real conveyer device 1", and an adjective "real" is attached to an event that has occurred in the real conveyer device 1. Items reproduced by the operation check device 50 are distinguished by adding an adjective "virtual".

The operation check device 50 of the present embodiment includes the operation reproduction unit 71 and the display device 53. The operation reproduction unit 71 is configured to create the operation reproduction video data and the energized state reproduction video data based on the log date that is inputted from the log data creation unit 51 into the external device 48. The display device 53 is configured to display video based on both of the video data.

The video can be paused, step forwarded, fast forwarded, rewound, slow reproduced, and enlarged, for example.

The display device 53 schematically displays a layout of the real conveyer device 1 as illustrated in FIG. 2.

The display device 53 displays an outline figure imitating the conveyer device 1, and a combination of rectangular figures imitating the conveyer units 2 and 20.

Figure 6A:
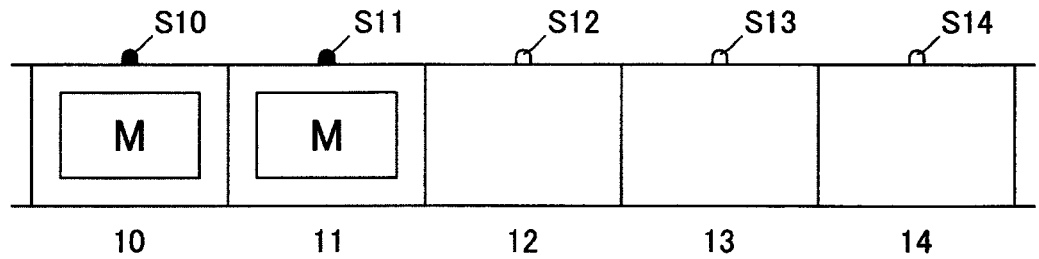
FIGS. 6A, 6B, and 6C are each an explanatory diagram illustrating a video displayed on a screen, showing the change of the video image with the elapse of time.

As illustrated in FIG. 6, the virtual layout can enlarge any position. Additionally, a zone where an article is placed on the real conveyer device 1 shows as a display M imitating the article in the virtual layout. FIGS. 1 and 6A each illustrate a state that an article is present at each of positions of the addresses 10 and 11. On the display screen, date and time are displayed to clarify when it occurs.

The display M imitating the article is performed based on an operation state of the load presence sensor S included in the log data. Specifically, the display M imitating the article is displayed in a virtual zone under a condition that record of the presence exists in the log data, whereby the presence of the article at a specific time is confirmed by the load presence sensor S of the real conveyer device 1 at a specific time.

Additionally, a zone in which the drive motor of the real conveyer device 1 is energized is displayed in the virtual zones, for example, in a wavy motion picture.

If the drive motor in the zone where the article is placed in the real conveyer device 1 is energized, video in which the virtual display M is moving is displayed. Moving speed and a moving distance are determined by intervals and the total number of pulses transmitted by the drive motor.

When a specific zone is clicked, video of an energized state of the conveyer unit constituting the zone is displayed.

For example, when an article exists in each of zones 10 and 11 at a specific time at which the real conveyer device 1 operates, and a load presence sensor S10 and a load presence sensor S11 are turned on, the fact is recorded in the log data.

When there is a record showing that the load presence sensors S10 and S11 are turned on, the operation video creation unit 80 of the operation reproduction unit 71 displays display M in each of virtual zones 10 and 11 as illustrated in FIG. 6A.

When the article in each of the zones 10 and 11 is conveyed toward the zone 12 in the real conveyer device 1, a record remains in the log data, the record showing that the drive motors in the zones 10, 11, and 12 are turned on and energized.

Figure 6B:
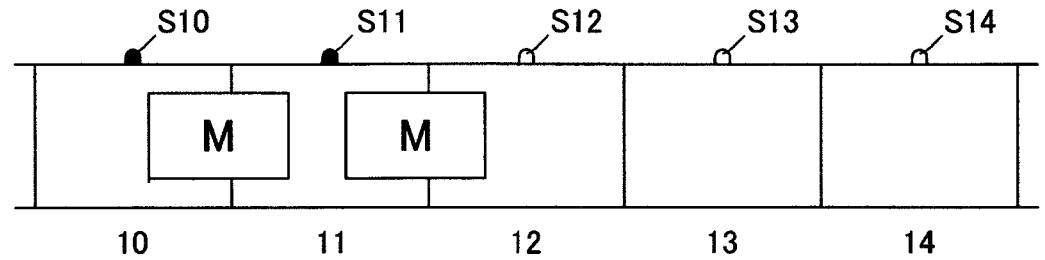

When the load presence sensor S10 and the load presence sensor S11 are turned on and there is the record showing that the drive motors in the zones are turned on and energized, the operation video creation unit 80 of the operation reproduction unit 71 moves the display M in each of the virtual zones 10 and 11 as illustrated in FIG. 6B.

When the articles in the zones 10 and 11 are completely moved to the zones 11 and 12, respectively, in the real conveyer device 1, a record remains in the log data, the record showing that the load presence sensors S11 and S12 are turned on.

Figure 6C:
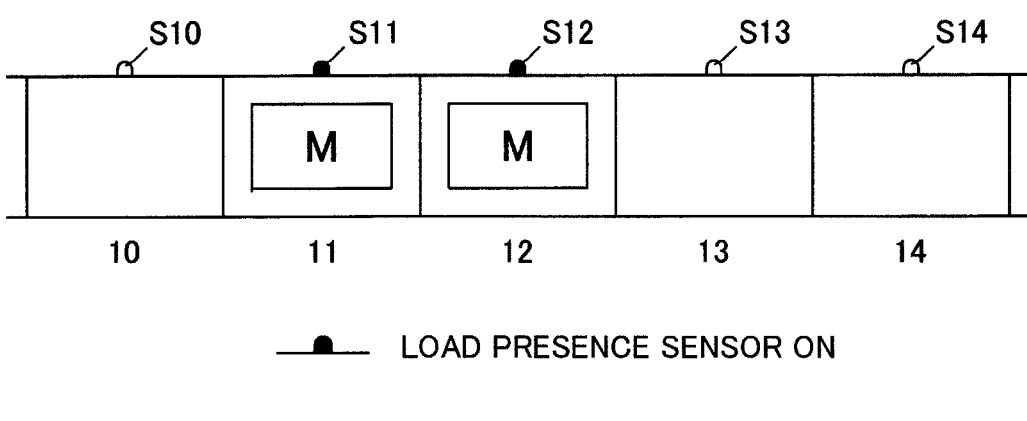

When there is a record showing that the load presence sensors S11 and S12 are turned on, the operation video creation unit 80 displays the display M in each of the virtual zones 11 and 12 as illustrated in FIG. 6C.

The operation check device 50 of the present embodiment allows the display device 53 to display an energized state of each of the conveyer units 2 and 20 from moment to moment. The display can be displayed on the same screen as the layout described above, or can be displayed by switching between screens.

The operation check device 50 is capable of not only designating a zone controller (conveyance unit) 10 by specifying a zone to perform individual reproduction of reproducing operation of the sequence circuit of the control circuit that controls the zone, but also designating multiple zones to perform multi-reproduction of simultaneously reproducing operation of a sequence circuit of each of control circuits that control the corresponding multiple zones.

FIG. 7 is a video showing an energized state of the conveyer unit 2 in the zone 12.

According to the above-described example, the real conveyer device 1 at a specific time has an article in each of the zones 10 and 11, but has no article in the zone 12 to be displayed.

Thus, the load presence sensor S12 is turned off. The drive motor of the conveyer unit 2 in the zone 12 is turned off and stopped, and the drive motor is not energized. These facts are recorded in the log data.

Figure 7A:
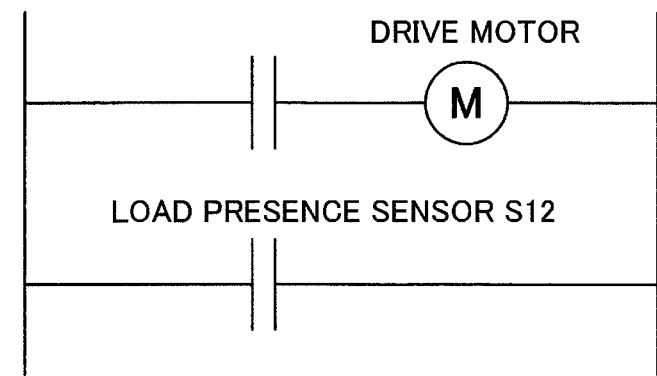
FIGS. 7A, 7B, and 7C are each illustrating a sequence circuit of a zone 12 displayed on a display screen, wherein FIGS. 7A, 7B, and 7C further illustrate energization states at the same time as those of FIGS. 6A, 6B, and 6C, respectively.

FIG. 7A corresponds to FIG. 6A, and a virtually displayed circuit includes the load presence sensor S12 that is turned off, and the drive motor that is also turned off.

According to the above-described example, when the article in each of the zones 10 and 11 is conveyed toward the zone 12 in the real conveyer device 1, a record remains in the log data, the record showing that the drive motor in the zone 12 is energized.

Figure 7B:
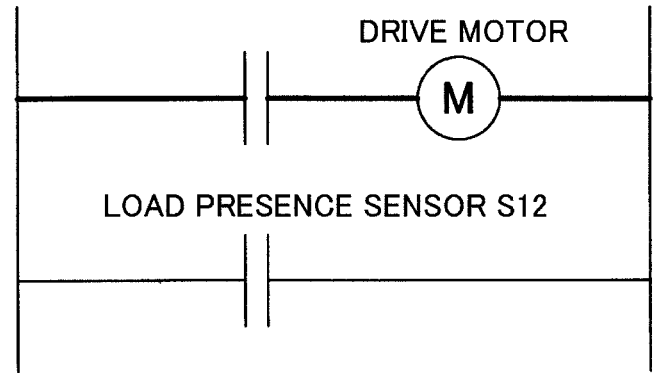

FIG. 7B corresponds to FIG. 6B, and the circuit displayed on the display device includes the load presence sensor S12 that is turned off and the drive motor that is turned on.

When the article in the zone 11 is completely moved to the zone 12 in the real conveyer device 1, a record remains in the log data, the record showing that the load presence sensor S12 is turned on, and the drive motor is turned off and is not energized.

Figure 7C:
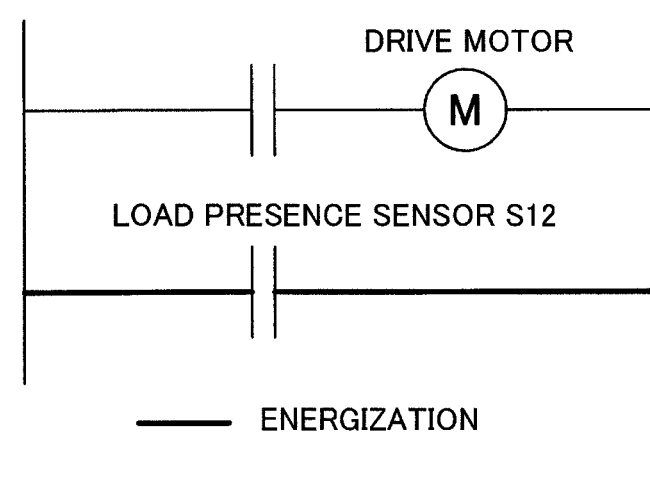

FIG. 7C corresponds to FIG. 6C, and the circuit displayed on the display device includes the load presence sensor S12 that is turned on and the drive motor that is turned off.

Even when the real conveyer device 1 has some sort of defect, driving states of the load presence sensor S and the drive motor, for example, at the time of the defect, are recorded in the log data.

Thus, a state of occurrence of the defect can be virtually reproduced. Additionally, a state of the electric circuit at that time can be checked. As a result, a cause of a failure or the like can be easily found.

Although the embodiment described above shows two representative examples of a conveyer unit, structure and form of the conveyer unit are not limited to these in the two types.

For example, the conveyer unit may include a curved path or a bar or the like that guides an article to a path.

The control circuit 40 with a simple configuration has been described above as an example for easy understanding. However, the control circuit 40 actually used has a more complex configuration.

Although some conveyer devices actually used have a zone without a load presence sensor or the like, or a zone that is constantly driven, the present invention does not exclude conveyer devices including these configurations.

The display device 53 may display a still image of a circuit.

Although the load presence sensor S in the embodiment described above is configured to be turned on when an article is detected, the load presence sensor S may be turned off when the article is detected.

The present invention includes a computer-readable recording medium on which the computer program is recorded. The present invention also includes a non-transitory recording medium on which the computer program is recorded.

EXPLANATION OF REFERENCE NUMBERS

1: conveyer device
2, 20: conveyer unit (conveyance unit)
5a: motor-incorporating roller
10: zone controller (individual controller)
28: motor-incorporating roller
40: control circuit
46: host control device
48: external device
50: operation check device for conveyer device
51: log data creation unit
52: controller
53: display device
60: information acquisition unit
61: time confirmation unit
62: storage unit
63: communications unit
70: storage unit
71: operation reproduction unit
72: communications unit
73: configuration storage unit
75: circuit storage unit
80: operation video creation unit
81: circuit video creation unit
100: conveyer system
S: load presence sensor

The invention claimed is:

1. An operation check device for checking operation of a conveyance device,
the conveyance device including:
a part constituted by connecting multiple conveyance units; and
a plurality of individual controllers, each individually controlling one of the multiple conveyance units, each individual controller having a control circuit with a sequence circuit,
the operation check device comprising: a log data creation unit; and an operation reproduction unit,
wherein the log data creation unit acquires information about on-off states of switches at a same time to create log data on each individual controller, the switches constituting the sequence circuit of each individual controller, and
wherein the operation reproduction unit reproduces operation of the sequence circuit of each individual controller based on the log data.

2. The operation check device according to claim 1, comprising:
individual reproducibility of designating one of the conveyance units to reproduce operation of the sequence circuit of the control circuit that controls the one of the conveyance units; and
multi-reproducibility of designating two or more of the conveyance units to simultaneously reproduce operation of the sequence circuits of the control circuits that control the two or more of the conveyance units.

3. The operation check device according to claim 1,
wherein at least one of the multiple conveyance units includes:
a drive device that drives the at least one conveyance unit; and
a load presence sensor that detects whether or not an article is present on the at least one conveyance unit,
wherein the log data created by the log data creation unit includes data on operation states of the drive motor on the at least one conveyance unit and the load presence sensor that detects whether or not an article is present on the at least one conveyance unit, each individually recorded, and
wherein the operation reproduction unit is capable of creating video data that schematically reproduces the operation of the conveyance device based on the log data.

4. The operation check device according to claim 1, further comprising a display device that displays a video based on the log data, the display device being capable of pausing, step forwarding, and fast forwarding the video.

5. The operation check device according to claim 1,
wherein the operation reproduction unit includes a configuration storage unit and a circuit storage unit,
wherein the configuration storage unit stores a constitution of a plurality of the conveyance units constituting the conveyance device and a connection between the plurality of conveyance units, and
wherein the circuit storage unit stores the control circuit of each of the plurality of conveyance units.

6. An operation check device for checking operation of a conveyance device,
the conveyance device including multiple conveyance units, at least one of the multiple conveyance units including:
a drive device that drives the at least one conveyance unit; and
a load presence sensor that detects whether or not an article is present on the at least one conveyance unit,
the operation check device comprising: a display device; a log data creation unit; and an operation reproduction unit,
wherein the log data creation unit creates log data on operation states of the at least one drive device and the load presence sensor that detects whether or not an article is present on the at least one conveyance unit, each of the operation states being individually recorded,
wherein based on the log data, the operation reproduction unit creates video data that schematically reproduces the operation of the conveyance device as well as operation state data on the at least one drive device and on the load presence sensor that detects whether or not an article is present on the at least one conveyance unit from moment to moment, and wherein the display device displays a video based on the video data created by the operation reproduction unit and an image based on the operation state data.

7. The operation check device according to claim 6, wherein the drive device that drives the at least one conveyance unit is a motor, and wherein the log data creation unit is configured to acquire an on-off state of the load presence sensor that detects whether or not an article is present on the at least one conveyance unit, an on-off status of the drive device that drives the at least one conveyance unit, and information about rotation during driving of the drive device that drives the at least one conveyance unit to create the log data.

8. The operation check device according to claim 6, wherein the at least one conveyance unit includes a control circuit controlling the at least one conveyance unit, the control circuit including a sequence circuit, and wherein the log data creation unit acquires information about on-off states of switches constituting the sequence circuit to create the log data.

9. The operation check device according to claim 6, wherein the display device is configured to display an outline figure imitating the conveyance device based on the video data, the outline figure being constituted by connecting figures imitating the at least one conveyance unit; and wherein when the load presence sensor that detects whether or not an article is present on the at least one conveyance unit detects the article, the figure imitating the at least one conveyance unit is displayed such that it includes a figure imitating an article.

10. The operation check device according to claim 9, wherein when the load presence sensor that detects whether or not an article is present on the at least one conveyance unit detects an article and the drive device that drives the at least one conveyance unit is energized on one of the conveyance units, the figure imitating the article moves toward an adjacent conveyance unit.

11. The operation check device according to claim 6, wherein the at least one conveyance unit includes a control circuit that controls the at least one conveyance unit, and wherein the operation check device is capable of displaying operation state of the control circuit of a specific one of the conveyance units from moment to moment.

12. The operation check device according to claim 6, wherein the operation reproduction unit includes a configuration storage unit and a circuit storage unit, wherein the configuration storage unit stores a constitution of multiple of the conveyance units constituting the conveyance device and a connection between the multiple conveyance units, and wherein the circuit storage unit stores the control circuit of each of the multiple conveyance units.

13. An operation check device for checking operation of a conveyance device, the conveyance device including a part constituted by connecting multiple conveyance units, at least one of the multiple conveyance units including:

a drive device that drives the at least one conveyance unit; and a load presence sensor that detects whether or not an article is present on the at least one conveyance unit, the operation check device comprising: a display device; a log data creation unit; and an operation reproduction unit, wherein the log data creation unit creates log data on operation states of the at least one drive device and the load presence sensor that detects whether or not an article is present on the at least one conveyance unit, each of the operation states being individually recorded, wherein based on the log data, the operation reproduction unit creates video data that schematically reproduces the operation of the conveyance device as well as operation state data on the drive device for the at least one conveyance unit and on the load presence sensor that detects whether or not an article is present on the at least one conveyance unit from moment to moment, and wherein the display device displays a video based on the video data created by the operation reproduction unit and an image based on the operation state data.

14. The operation check device according to claim 13, wherein the drive device that drives the at least one conveyance unit is a motor, and wherein the log data creation unit is configured to acquire an on-off state of the load presence sensor that detects whether or not an article is present on the at least one conveyance unit, an on-off status of the drive device that drives the at least one conveyance unit, and information about rotation during driving of the drive device that drives the at least one conveyance unit to create the log data.

15. The operation check device according to claim 13, wherein the at least one conveyance unit includes a control circuit controlling the at least one conveyance unit, the control circuit including a sequence circuit, and wherein the log data creation unit acquires information about on-off states of switches constituting the sequence circuit to create the log data.

16. The operation check device according to claim 13, wherein the display device is configured to display an outline figure imitating the conveyance device based on the video data, the outline figure being constituted by connecting figures imitating the at least one conveyance unit; and wherein when the load presence sensor detects the article on the at least one conveyance unit, the figure imitating the at least one conveyance unit is displayed such that it includes a figure imitating an article.

17. The operation check device according to claim 16, wherein when the load presence sensor that detects whether or not an article is present on the at least one conveyance unit detects an article and the drive device for driving one of the at least one conveyance units is energized on one of the conveyance units, the figure imitating the article moves toward an adjacent conveyance unit.

18. The operation check device according to claim 13, wherein the at least one conveyance unit includes a control circuit that controls the at least one conveyance unit, and wherein the operation check device is capable of displaying operation state of the control circuit of a specific one of the at least one conveyance units from moment to moment.

19. The operation check device according to claim 13, wherein the operation reproduction unit includes a configuration storage unit and a circuit storage unit, wherein the configuration storage unit stores a constitution of a plurality of the conveyance units constituting the conveyance device and a connection between the plurality of conveyance units, and wherein the circuit storage unit stores the control circuit of each of the plurality of conveyance units.

20. A non-transitory recording medium comprising therein a computer program for operating an operation check device that checks operation of a conveyance device, wherein the conveyance device is constituted by connecting multiple conveyance units, at least one of the conveyance units including:

a drive device that drives the at least one of the conveyance units; and a load presence sensor that detects whether or not an article is present on the at least one of the conveyance units, the computer program causing the operation check device to execute a process comprising:

inputting log data recording operation states of the drive device for the at least one conveyance unit and the load presence sensor that detects whether or not an article is present on the at least one conveyance unit, both being recorded individually; and creating video data schematically reproducing operation of the at least one conveyance device; data on operation state of the drive device for the at least one conveyance unit from moment to moment; and data on operation state of the load presence sensor that detects whether or not an article is present on the at least one conveyance unit from moment to moment.

* * * * *